US012217670B2

(12) United States Patent
Yin

(10) Patent No.: US 12,217,670 B2
(45) Date of Patent: Feb. 4, 2025

(54) PIXEL DRIVING CIRCUIT AND DRIVING METHOD THEREFOR, DISPLAY PANEL AND DRIVING METHOD THEREFOR

(71) Applicant: BOE TECHNOLOGY GROUP CO., LTD., Beijing (CN)

(72) Inventor: Xinshe Yin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 139 days.

(21) Appl. No.: 17/638,942

(22) PCT Filed: Apr. 6, 2021

(86) PCT No.: PCT/CN2021/085627
§ 371 (c)(1),
(2) Date: Feb. 28, 2022

(87) PCT Pub. No.: WO2021/218579
PCT Pub. Date: Nov. 4, 2021

(65) Prior Publication Data

US 2022/0319426 A1 Oct. 6, 2022

(30) Foreign Application Priority Data

Apr. 29, 2020 (CN) ......................... 202010356112.6

(51) Int. Cl.
*G09G 3/3233* (2016.01)

(52) U.S. Cl.
CPC ... *G09G 3/3233* (2013.01); *G09G 2300/0852* (2013.01); *G09G 2310/061* (2013.01); *G09G 2320/0233* (2013.01)

(58) Field of Classification Search
CPC ........................... G09G 3/3233; G09G 3/3258
See application file for complete search history.

(56) References Cited

U.S. PATENT DOCUMENTS 10,304,389 B2 5/2019 Li
10,679,554 B2 6/2020 Zhang et al.
(Continued)

FOREIGN PATENT DOCUMENTS

CN 1595484 A 3/2005
CN 1835059 A 9/2006
(Continued)

OTHER PUBLICATIONS

International Search Report and Written Opinion mailed on Jun. 23, 2021, corresponding PCT/CN2021/085627, 3 pages.
(Continued)

*Primary Examiner* — Yuzhen Shen
(74) *Attorney, Agent, or Firm* — XSENSUS LLP

(57) ABSTRACT

A pixel driving circuit and a driving method therefor, and a display panel and a driving method therefor are described. The pixel driving circuit includes a signal writing circuit connected to a composite signal end, a gate driving signal end, and a first node, configured to transmit a signal of the composite signal end in response to a signal of the gate driving signal end; a driving circuit; a first memory circuit connected between the first node and a second node; a second memory circuit connected between the second node and a first power supply end; a compensation circuit connected to the second node, a third node, and a control signal end; a light-emitting control circuit connected to the third node, a fourth node, and an enable signal end; and a reset circuit connected to the composite signal end, the second node, and a reset signal end.

3 Claims, 5 Drawing Sheets

(56) References Cited

U.S. PATENT DOCUMENTS

| | | | | |
|---|---|---|---|---|
| 2011/0025653 | A1* | 2/2011 | Ikeda | G09G 3/3233 345/204 |
| 2012/0007848 | A1* | 1/2012 | Han | G09G 3/3233 345/212 |
| 2018/0130412 | A1 | 5/2018 | Zhang et al. | |
| 2019/0096334 | A1* | 3/2019 | Li | H10K 59/1213 |
| 2020/0365074 | A1* | 11/2020 | Hashimoto | G09G 3/32 |

FOREIGN PATENT DOCUMENTS

| | | | |
|---|---|---|---|
| CN | 102930824 | A | 2/2013 |
| CN | 104821150 | A | 8/2015 |
| CN | 106898304 | A | 6/2017 |
| CN | 106960659 | A | 7/2017 |
| CN | 107507566 | A | 12/2017 |
| CN | 107993612 | A | 5/2018 |
| CN | 108447446 | A | 8/2018 |
| CN | 109935207 | A | 6/2019 |
| CN | 110675822 | A | 1/2020 |
| CN | 111402807 | A | 7/2020 |
| KR | 10-0873075 | B1 | 12/2008 |

OTHER PUBLICATIONS

Office Action issued on Dec. 3, 2020, in corresponding Chinese patent Application No. 202010356112.6, 24 pages.

Office Action issued on May 11, 2021, in corresponding Chinese patent Application No. 202010356112.6, 17 pages.

* cited by examiner

PIXEL DRIVING CIRCUIT AND DRIVING METHOD THEREFOR, DISPLAY PANEL AND DRIVING METHOD THEREFOR

CROSS-REFERENCE TO RELATED APPLICATIONS

The present application is a national phase entry under 35 U.S.C. § 371 of International Application No. PCT/CN2021/085627 filed on Apr. 6, 2021, which claims the benefit of and priority to Chinese Patent Application No. 202010356112.6 filed on Apr. 29, 2020, and entitled "PIXEL DRIVING CIRCUIT AND DRIVING METHOD THEREFOR, DISPLAY PANEL AND DRIVING METHOD THEREFOR", the entire disclosures of both of which are incorporated herein by reference as a part of the present application.

TECHNICAL FIELD

The present disclosure relates to the technical field of display technology and, in particular to a pixel driving circuit and a driving method therefor, a display panel and a driving method therefor.

BACKGROUND

Generally, a pixel driving circuit includes a driving transistor, a source of which is connected to a power supply signal end, and a gate of which is used for receiving a data signal to output a driving current by a drain. The driving current output by the drain of the driving transistor is $I=(\mu WCox/2L)(Vgs-Vth)^2$, where μ represents a carrier mobility, Cox represents a gate capacitance per unit area, W represents a channel width of the driving transistor, L represents a channel length of the driving transistor, Vgs represents a gate-source voltage difference of the driving transistor, and Vth represents a threshold voltage of the driving transistor. According to the above-mentioned driving current formula, it can be known that the driving current output by the driving transistor is related to the threshold voltage of the driving transistor and the voltage of the power supply signal end.

It should be noted that the information disclosed in the above-mentioned BACKGROUND section is only for better understanding of the background of the present disclosure, and thus may include information that does not pertain to prior art known to those of ordinary skill in the art.

SUMMARY

According to one aspect of the present disclosure, there is provided a pixel driving circuit, the pixel driving circuit includes: a signal writing circuit, a driving circuit, a first memory circuit, a second memory circuit, a compensation circuit, a light-emitting control circuit, and a reset circuit. The signal writing circuit is connected to a composite signal end, a gate driving signal end, and a first node, and is configured to transmit a signal of the composite signal end to the first node in response to a signal of the gate driving signal end. The driving circuit is connected to a first power supply end, a second node, and a third node, and is configured to input a driving current to the third node according to a signal of the second node. The first memory circuit is connected between the first node and the second node. The second memory circuit is connected between the second node and the first power supply end. The compensation circuit is connected to the second node, the third node, and a control signal end, and is configured to connect the second node and the third node in response to a signal of the control signal end. The light-emitting control circuit is connected to the third node, a fourth node, and an enable signal end, and is configured to connect the third node and the fourth node in response to a signal of the enable signal end. The reset circuit is connected to the composite signal end, the second node, and a reset signal terminal, and is configured to transmit the signal of the composite signal end to the second node in response to a signal of the reset signal end.

According to one aspect of the present disclosure, there is provided a method for driving a pixel driving circuit, for driving the above-mentioned pixel driving circuit, the method includes: in a reset phase, inputting the initialization signal to the composite signal end, inputting a turn-on signal to the reset signal end, and simultaneously inputting a turn-on signal to the gate driving signal end; in a threshold establishing phase, turning on the driving transistor by inputting the reference voltage signal to the composite signal end, inputting a turn-on signal to the control signal end, and simultaneously inputting a turn-on signal to the gate driving signal end; in a data writing phase, inputting the data signal to the composite signal end, and inputting a turn-on signal to the gate driving signal end; and in the light-emitting phase, inputting a turn-on signal to the enable signal end.

According to one aspect of the present disclosure, there is provided a display panel including the above-mentioned pixel driving circuit.

According to one aspect of the present disclosure, there is provided a method for driving a display panel, for driving the above-mentioned display panel. One frame period of the display panel includes: a first blank period, a scanning period, and a second blank period in order; and the reset phase and the threshold establishing phase of each pixel driving circuit of the display panel are in the first blank period of the frame or a second blank period of a previous frame.

According to one aspect of the present disclosure, there is provided a method for driving a display panel, for driving the above-mentioned display panel. One frame period of the display panel includes: a blank period and a scanning period in order; and the reset phase and threshold establishing phase of each pixel driving circuit of the display panel are in the blank period of the frame.

According to one aspect of the present disclosure, there is provided a method for driving a display panel, for driving the above-mentioned display panel, One frame period of the display panel includes: a scanning period and a blank period in order; and the reset phase and threshold establishing phase of each pixel driving circuit of the display panel are in the blank period of the previous frame.

It should be understood that both the foregoing general description and the following detailed description are exemplary and explanatory only and are not restrictive of the present disclosure.

BRIEF DESCRIPTION OF THE DRAWINGS

Accompanying drawings herein, which are incorporated in the specification and constitute a part of the present specification, illustrate embodiments conforming to the present disclosure, and are used to explain the principles of the present disclosure together with the specification. It is apparent that the accompanying drawings described below only show some embodiments of the present disclosure, and other accompanying drawings can also be obtained according to these accompanying drawings without any creative efforts by those skilled in the art.

DETAILED DESCRIPTION

Figure 1:
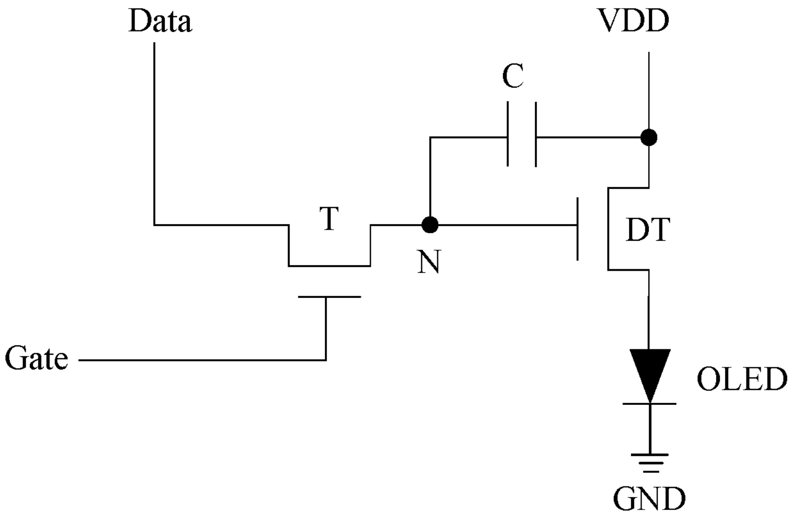
FIG. 1 is a structural schematic diagram of a pixel driving circuit in a related art.

Exemplary embodiments will now be described more comprehensively with reference to the accompanying drawings. However, the example embodiments can be implemented in various forms, and should not be construed as being limited to the examples set forth herein; on the contrary, these embodiments are provided to make the present disclosure be more comprehensive and complete, and various concepts of the example embodiments will be comprehensively communicated to those skilled in the art. The same reference numerals in the accompanying drawings denote the same or similar structures, and thus detailed description thereof will be omitted.

Terms "one", "a/an", and "the" are used to denote the presence of one or more elements/components/etc. Terms "including" and "having" are used to denote the meaning of inclusive inclusion and refer to that there may be other elements/components/etc. in addition to the listed elements/components/etc.

As shown in FIG. 1, which is a structural schematic diagram of a pixel driving circuit in a related art, the pixel driving circuit includes a switch transistor T, a driving transistor DT, a capacitor C, and a light-emitting unit OLED. The switch transistor T and the driving transistor DT may be N-type transistors. A first end of the switch transistor T is connected to the data signal end Data, a second end of which is connected to a node N, and a control end of which is connected to the gate driving signal end Gate. A first end of the driving transistor DT is connected to a power supply end VDD, and the light-emitting unit OLED is connected between the second end of the driving transistor DT and the ground end GND. The driving method of the pixel driving circuit includes a data writing phase and a light-emitting phase. In the data writing phase, the gate driving signal end Gate outputs a high level signal to turn on the switch transistor T, while the data signal end outputs a data signal to transmit the data signal to the node N and store it in the capacitor C at the same time. In the light-emitting phase, the driving transistor DT is turned on by the node N to input the driving current to the light-emitting unit OLED. The driving current output by the driving transistor is $I=(\mu WCox/2L)(Vgs-Vth)^2$, where μ represents a carrier mobility, Cox represents a gate capacitance per unit area, W represents a channel width of the driving transistor, L represents a channel length of the driving transistor, Vgs represents a gate-source voltage difference of the driving transistor, and Vth represents a threshold voltage of the driving transistor. However, due to the manufacturing process, the threshold voltages of the driving transistors in different sub-pixel units on the display panel are different. That is, even if the same data signal is input to different sub-pixel units, the different sub-pixel units do not have different light-emitting brightness, which is the hourglass phenomenon that we see in a picture, i.e., the phenomenon of uneven brightness in a small area.

Figure 2:
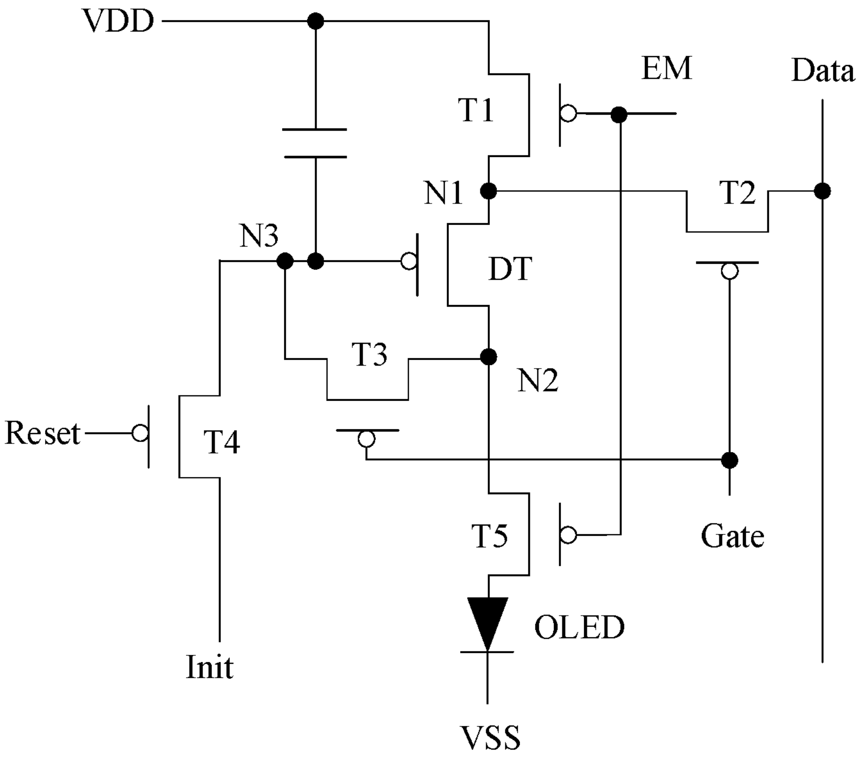
FIG. 2 is a structural schematic diagram of another pixel driving circuit in a related art.

As shown in FIG. 2, which is a structural schematic diagram of another pixel driving circuit in a related art, the pixel driving circuit includes a first switch transistor T1 to a fifth switch transistor T5, a driving transistor DT, and a capacitor C, where the first switch transistor T1 to the fifth switch transistor T5, and the driving transistor DT may be P-type transistors. A first end of the first switch transistor T1 is connected to a first power supply end VDD, a second end of which is connected to a first node N1, and a control end of which is connected to an enable signal end EM. A first end of the second switch transistor T2 is connected to the first node N1, a second end of which is connected to a data signal end Data, and a control end of which is connected to a gate driving signal end Gate. A first end of the driving transistor DT is connected to the first node N1, a second end of which is connected to a second node N2, and a control end of which is connected to a third node N3. A first end of the third switch transistor T3 is connected to a third node N3, a second end of which is connected to the second node N2, and a control end of which is connected to the gate driving signal end Gate. A first end of the fourth switch transistor T4 is connected to an initial signal end Init, a second end of which is connected to the third node N3, and a control end of which is connected to a reset signal end Reset. A first end of the fifth switch transistor T5 is connected to the second node N2, a second end of which is connected to an anode of a light-emitting unit OLED, and a control end of which is connected to the enable signal end EM. The capacitor C is connected between the first power supply end VDD and the third node N3. A cathode of the light-emitting unit OLED is connected to a second power supply end VSS.

Figure 3:
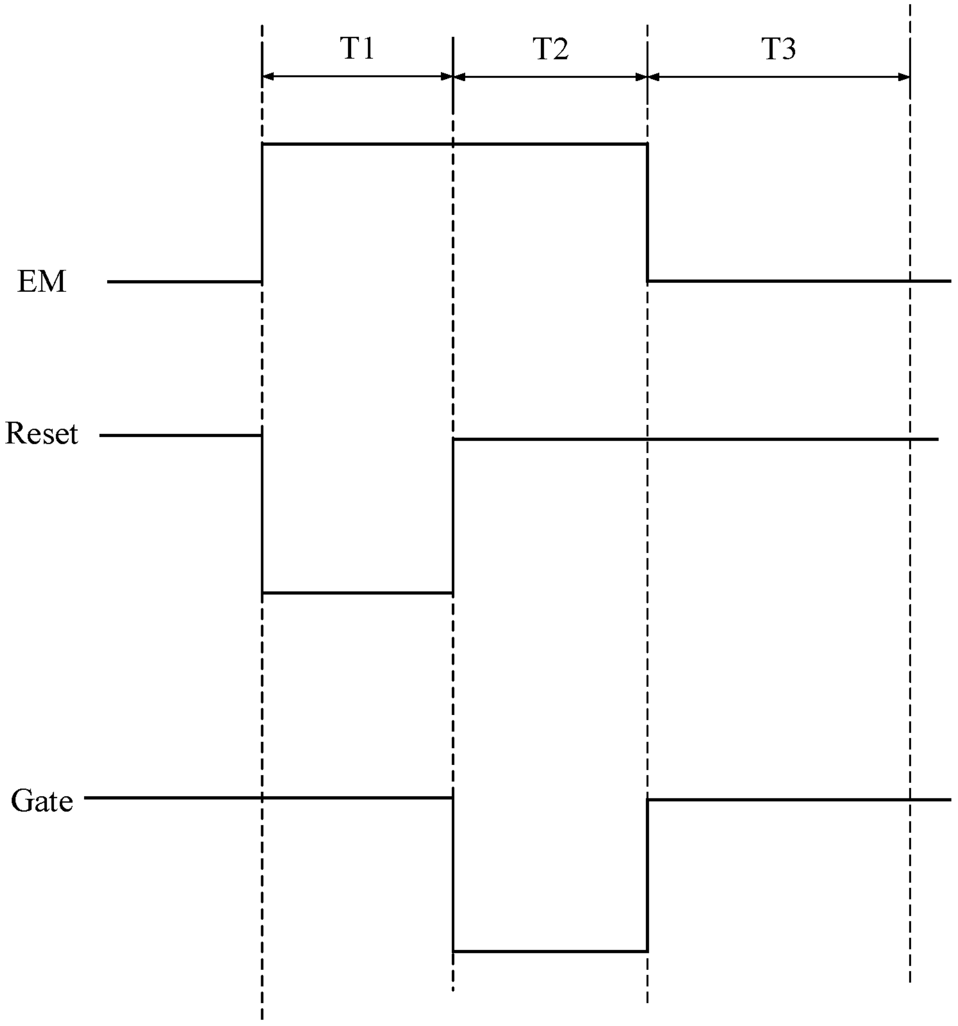
FIG. 3 is a timing diagram of each node in a method for driving the pixel driving circuit in FIG. 2.

As shown in FIG. 3, which is a timing diagram of each node in a method for driving the pixel driving circuit in FIG. 2, the method for driving the pixel driving circuit includes three phases, i.e., an initial phase T1, a data writing phase T2, and a light-emitting phase T3. In the initial phase T1, the reset signal end Reset inputs a low level signal, the fourth switch transistor T4 is turned on, and the initial signal end Init inputs an initialization signal to the third node N3. In the data writing phase, the gate driving signal end Gate inputs a low level signal, the second switch transistor T2 and the third switch transistor T3 are turned on, and the data signal end Data inputs a data signal to the first node N1 and the third node N3. At the same time, the driving transistor DT is turned on, and the voltages of the second node N2 and the third node N3 gradually increase until the voltage of the third node is equal to Vdata+Vth, where Vdata represents the voltage of the data signal, and Vth represents the threshold voltage of the driving transistor. In the light-emitting phase T3, the enable signal end EM inputs a low level signal, the first switch transistor T1 and the fifth switch transistor T5 are turned on, and the light-emitting unit OLED emits light under a voltage difference between the first power supply end VDD and the second power supply end VSS, at this time, a current at an output end of the driving transistor $I=(\mu WCox/2L)(Vgs-Vth)^2=(\mu WCox/2L)(Vdata+Vth-VDD-Vth)^2=(\mu WCox/2L)(Vdata-VDD)^2$, where VDD represents the voltage of the first power supply VDD. As can be seen from this formula, in this pixel driving circuit, the output current of the driving transistor DT is independent of the threshold voltage of the driving transistor DT. Therefore, the application of the display panel of the pixel driving circuit can avoid the uneven display brightness due to different threshold voltages of the driving transistors in different sub-pixel units.

However, in the display panel, due to the difference of the size parameters of the driving transistors and the threshold voltage drift of the driving transistors during use, which leads to the difference of the threshold voltage of the driving transistor in the display panel, so that the display brightness of the display panel is not uniform. In addition, since there is RC voltage drop of the power line for providing the power supply signal to the first power supply end VDD, the power supply signal voltages of the first power supply ends VDDs in different pixel driving circuits in the display panel are different, and the difference can still cause the uneven display brightness of the display panel. Furthermore, the display driving circuit has a large number of switch transistors, which is not favorable for the miniaturization development of the sub-pixel unit and is costly.

Figure 4:
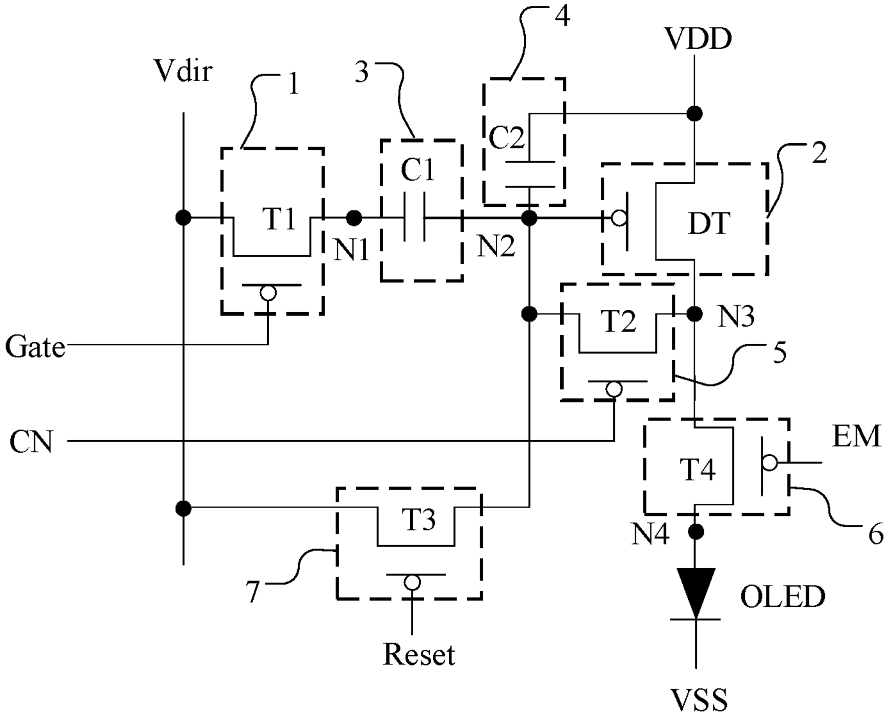
FIG. 4 is a structural schematic diagram of a pixel driving circuit in one exemplary embodiment of the present disclosure.

Based on this, the present disclosure provides a pixel driving circuit, as shown in FIG. 4, which is a structural schematic diagram of the pixel driving circuit in one exemplary embodiment of the present disclosure. The pixel driving circuit includes: a signal writing circuit 1, a driving circuit 2, a first memory circuit 3, a second memory circuit 4, a compensation circuit 5, a light-emitting control circuit 6, and a reset circuit 7. The signal writing circuit 1 is connected to a composite signal end Vdir, a gate driving signal end Gate, and a first node N1, and is configured to transmit a signal of the composite signal end Vdir to the first node N1 in response to a signal of the gate driving signal end Gate. The driving circuit 2 is connected to a first power supply end VDD, a second node N2, and a third node N3, and is configured to input a driving current to the third node N3 according to a signal of the second node N2. The first memory circuit 3 is connected between the first node N1 and the second node N2. The second memory circuit 4 is connected between the second node N2 and the first power supply end VDD. The compensation circuit 5 is connected to the second node N2, the third node N3, and a control signal end CN, and is configured to connect the second node N2 and the third node N3 in response to a signal of the control signal end CN. The light-emitting control circuit 6 is connected to the third node N3, the fourth node N4, and an enable signal end EM, and is configured to connect the third node N3 and the fourth node N4 in response to a signal of the enable signal end EM. The reset circuit 7 is connected to the composite signal end Vdir, the second node N2 and the reset signal end Reset, and is configured to transmit the signal of the composite signal end Vdir to the second node N2 in response to a signal of the reset signal end Reset.

In this exemplary embodiment, as shown in FIG. 4, the signal writing circuit 1 may include a first switch transistor T1, a first end of which is connected to the composite signal end Vdir, a second end of which is connected to the first node N1, and a control end of which is connected to the gate driving signal end Gate. The driving circuit 2 may include a driving transistor DT, a first end of which is connected to the first power supply end VDD, a second end of which is connected to the third node N3, and a control end of which is connected to the second node N2. The first memory circuit 3 may include a first capacitor C1, which is connected between the first node N1 and the second node N2. The second memory circuit 4 may include a second capacitor C2, which is connected between the second node N2 and the first power supply end VDD. The compensation circuit 5 may include a second switch transistor T2, a first end of which is connected to the second node N2, a second end of which is connected to the third node N3, and a control end of which is connected to the control signal end CN. The reset circuit 7 may include a third switch transistor T3, a first end of which is connected to the composite signal end Vdir, a second end of which is connected to the second node N2, and a control end of which is connected to the reset signal end Reset. The light-emitting control circuit 6 may include a fourth switch transistor T4, a first end of which is connected to the third node N3, a second end of which is connected to the fourth node N4, and a control end of which is connected to the enable signal end EM. The fourth node N4 may be connected to one end of a light-emitting unit OLED, and the other end of the light-emitting unit OLED may be connected to the second power supply end VSS.

Figure 5:
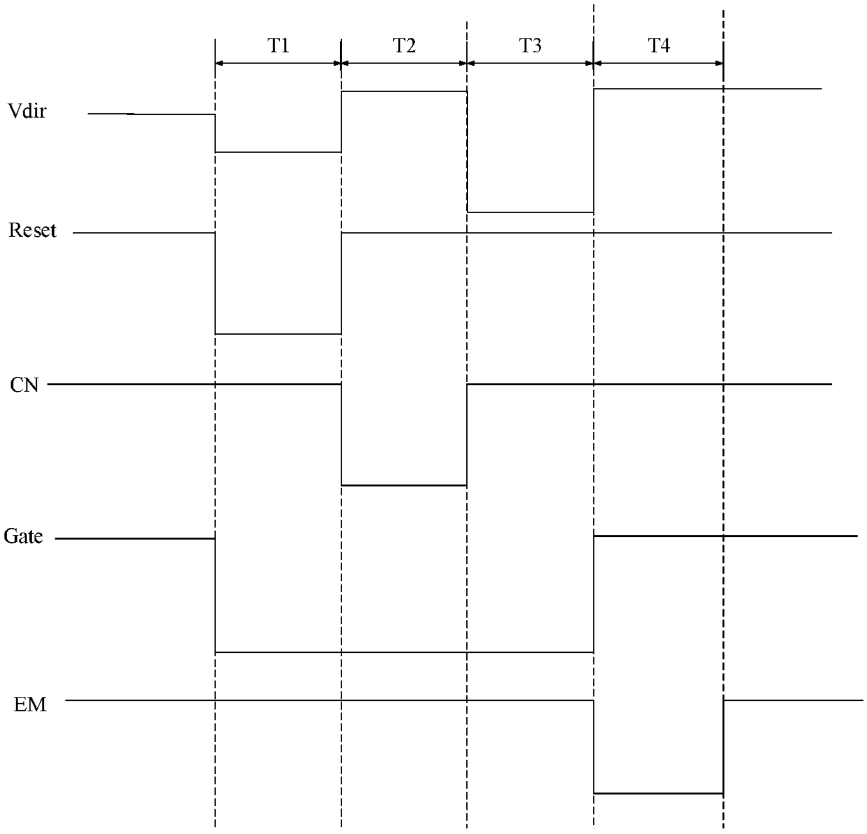
FIG. 5 is a timing diagram of each node in one exemplary method for driving a pixel driving circuit of the present disclosure.

In this exemplary embodiment, the first switch transistor T1 to the fourth switch transistor T4, and the driving transistor DT may be P-type transistors. As shown in FIG. 5, which is a timing diagram of each node in one exemplary method for driving a pixel driving circuit of the present disclosure, Vdir represents a timing of the composite signal end, Reset represents a timing of the reset signal end, CN represents a timing of the control signal end, Gate represents a timing of the gate driving signal end, and EM represents a timing of the enable signal end. A signal of the first power supply end VDD is continuously at a high level, and a signal of the second power supply end VSS is continuously at a low level. The method for driving the pixel driving circuit includes four phases, i.e., a reset phase T1, a threshold establishing phase T2, a data writing phase T3 and a light-emitting phase T4.

In the reset phase T1, the reset signal end Reset outputs a low level signal to turn on the third switch transistor T3, the composite signal end Vdir outputs an initialization signal to input the initialization signal to the second node and store it in the first and second capacitors C1 and C2. At the same time, the gate driving signal end Gate outputs a low level signal to turn on the first switch transistor T1, the initialization signal of the composite signal end Vdir also inputs to the first node N1 and is stored in the first capacitor C1. At this time, the charge stored in the second capacitor C2 is Q2=C2*(Vinit−VDD), where C2 represents the capacitance value of the second capacitor C2, VDD represents the voltage of the first power supply end, and Vinit represents the voltage of the initialization signal. In addition, the charge stored in the first capacitor C1 is Q1=0.

In the threshold establishing phase T2, the reset signal end Reset outputs a high level signal, the third switch transistor T3 is turned off, the pixel driving signal end Gate outputs a low level signal to turn on the first switch transistor T1, and the composite signal end Vdir outputs a reference voltage signal to turn on the driving transistor DT. At the same time, the control signal end CN outputs a low level signal to turn on the second switch transistor T2. At the same time, the driving transistor DT is turned on, the first power supply end VDD charges the second node N2 and the third node N3, and the voltages of the second node N2 and the third node N3 gradually increase until the voltages of the second node N2 and the third node N3 increase to VDD+Vth. After the threshold establishing phase is completed, the charge of the second node N2 stored in the first capacitor C1 is Qc1=C1* (VDD+Vth−Vref), and the charge of the second node N2 stored in the second capacitor C2 is Qc2=C2*(VDD+Vth−VDD)=C2*Vth, where Vref represents the voltage of the reference voltage signal. The total charge of the second node N2 stored in the first capacitor C1 and the second capacitor C2 is Q2=Qc1+Qc2=C1*(VDD+Vth−Vref)+C2*Vth. In addition, in order to turn on the driving transistor DT in the initial phase of the threshold establishing phase T2, i.e., to turn on the driving transistor by the composite signal end Vdir outputting the reference voltage signal, the voltage value Vref of the reference voltage needs to satisfy a certain value. According to the principle of capacitance-charge balance, before and after the threshold establishing phase, the charge of the second node N2 does not change, i.e., Q2=C2*(Vinit−VDD)=C2*(V2−VDD)+C1*(V2−Vref), where Q2 is the charge amount of the second node. According to the formula, V2=(C2*Vinit+C1*Vref)/(C1+C2) can be obtained. In order to turn on the driving transistor DT, the gate-source voltage difference Vgs of the driving transistor needs to be smaller than the threshold voltage of the driving transistor DT, i.e., Vgs=V2−VDD=(C2*Vinit+C1*Vref)/(C1+C2)−VDD<Vth.

In a data writing phase T3, the reset signal end Reset, the control signal end CN, and the enable signal end EM output high level signals. The gate driving signal end Gate outputs a low level signal to turn on the first switch transistor T1. The composite signal end Vdir outputs a data signal to input the data signal to the first node N1. At this time, a voltage division of the data signal and the signal of the first power supply end VDD is generated on the first capacitor C1 and the second capacitor C2. During the voltage division process, the charge amount of the second node N2 is unchanged, i.e., Q2=C2*Vth+C1*(VDD+Vth−Vref)=C1*(V2−Vdata)+C2*(V2−VDD), where Vdata represents the voltage of the data signal. According to this formula, the voltage of the second node can be obtained as V2=VDD+Vth+(C1*Vdata−C1*Vref)/(C2+C1).

In the light-emitting phase T4, the reset signal end Reset, the control signal end CN and the gate driving signal end Gate output high level signals. The enable signal end EM outputs a low level signal to turn on the fourth switch transistor T4. At this time, the gate-source voltage difference of the driving transistor DT is Vgs=V2−VDD=VDD+Vth+(C1*Vdata−C1*Vref)/(C2+C1)−VDD=Vth+(C1*Vdata−C1*Vref). The output current of the driving transistor DT is $I=(\mu WCox/2L)(Vgs-Vth)^2=(\mu WCox/2L)(C1*Vdata-C1*Vref)^2$. According to this formula, it can be known that the output current of the driving transistor in the pixel driving circuit is independent of the threshold voltage Vth and the voltage VDD of the first power supply end. Therefore, the pixel driving circuit can solve the technical problem of uneven display brightness due to different threshold voltages and first power supply end voltages of the driving transistors in different pixel driving circuits. In addition, the pixel driving circuit includes only 5 transistors. Compared with 6 transistors of the pixel driving circuit in the related art, the structure is simpler, and at the same time, a smaller sub-pixel unit can be realized, so that a display panel with higher pixel density is realized.

It should be understood that, in other exemplary embodiments, the signal writing circuit 1, the driving circuit 2, the first memory circuit 3, the second memory circuit 4, the compensation circuit 5, the light-emitting control circuit 6 and the reset circuit 7 may have more structures available for selection, and all of these fall within the protection scope of the present disclosure.

This exemplary embodiment also provides a display panel, which includes the above-mentioned pixel driving circuit. The pixel driving circuits in the same column may be connected to the same composite signal end Vdir, and the pixel driving circuits in the same row may be connected to the same gate driving signal end Gate, the same reset signal end Reset, the same control signal end CN, and the same enable signal end EM.

In this exemplary embodiment, the pixel driving circuits in the display panel may proceed through the reset phase T1, the threshold establishing phase T2, data writing phase T3, and the light-emitting phase T4 row by row. However, as the refresh frequency of the display panel increases, the scanning time of each row of the display panel decreases. To ensure the time of the data writing phase T3 and the light-emitting phase T4, the time that can be used for the reset phase T1 and the threshold establishing phase T2 decreases. As a result, the pixel driving circuit does not sufficiently reset the second node in the reset phase, and does not sufficiently compensate the threshold voltage to the second node in the threshold establishing phase.

Figure 6:
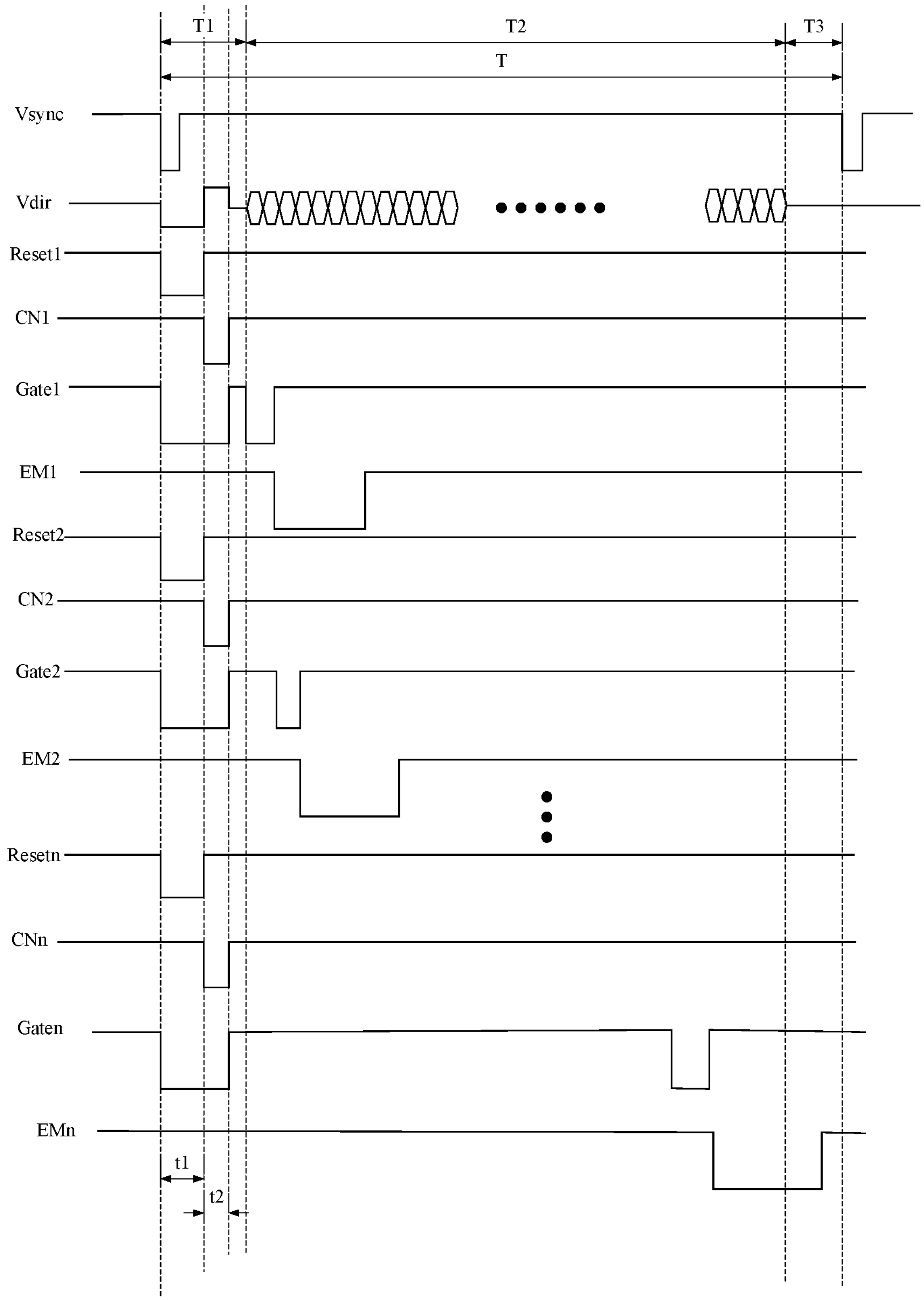
FIG. 6 is a timing diagram of each node in one exemplary method for driving a display panel of the present disclosure.

Based on this, this exemplary embodiment also provides a method for driving a display panel, for driving the above-mentioned display panel. As shown in FIG. 6, which is a timing diagram of each node in one exemplary method for driving the display panel of the present disclosure, Vdir represents a timing of the composite signal end connected to a certain column of pixel driving circuits, Reset1 represents a timing of the reset signal end connected to a first row of the pixel driving circuits, CN1 represents a timing of the control signal end connected to the first row of the pixel driving circuits, Gate1 represents a timing of the gate driving signal end connected to the first row of the pixel driving circuits, and EM1 represents a timing of the enable signal end connected to the first row of the pixel driving circuits. Reset2 represents a timing of the reset signal end connected to the second row of the pixel driving circuits, CN2 represents a timing of the control signal end connected to the second row of the pixel driving circuits, Gate2 represents a timing of the gate driving signal end connected to the second row of the pixel driving circuits, and EM2 represents a timing of the enable signal end connected to the second row of the pixel driving circuits. And so forth, Resetn represents a timing of the reset signal end connected to a $n^{th}$ row of the pixel driving circuits, CNn represents a timing of the control signal end connected to the $n^{th}$ row of the pixel driving circuits, Gaten represents a timing of the gate driving signal end connected to the $n^{th}$ row of the pixel driving circuits, and EMn represents a timing of the enable signal end connected to the $n^{th}$ row of the pixel driving circuits. Vsync represents a timing of a field synchronization signal of the display panel.

As shown in FIG. 6, a falling edge of one low level of the field synchronization signal to a falling edge of the next low level signal is one frame period T. One frame period T of the display panel includes a first blank period T1, a scanning period T2, and a second blank period T3 in order. The scanning period T2 is the actual period of row-by-row scanning of the display panel, that is, the first row of the pixel driving circuits receives the gate driving signal of the gate driving signal end until the last row of the pixel driving circuits receives the gate driving signal of the gate driving signal end. The first blank period T1 and the second blank period T3 are non-scanning periods of the display panel. As shown in FIG. 6, the reset phase t1 and the threshold establishing phase t2 of all pixel driving circuits in the display panel are in the first blank period of the frame. The data writing phase of all pixel driving circuits in the display panel is in the scanning period T2 of the frame. The reset phase t1 of all pixel driving circuits in the display panel may be performed at the same time, and the threshold establishing phase t2 of all pixel driving circuits in the display panel may be performed at the same time, so that the second node in the pixel driving circuits can be sufficiently reset in the reset phase, and the threshold voltage can be sufficiently compensated to the second node in the threshold establishing phase.

It should be understood that, in other exemplary embodiments, the reset phase t1, the threshold establishing phase t2 of all pixel driving circuits in the display panel may be in the second blank period of the previous frame. In this exemplary embodiment, during the driving process of each of the pixel driving circuits, the duration of the light-emitting phase is equal. That is, in the same frame, the duration of the active level (low level) output by the enable signal end connected to each row of the pixel driving circuits is equal. In this way, the light-emitting units in each row of the pixel driving circuits have the same light-emitting brightness.

In this exemplary embodiment, when the pixel driving circuits in the display panel proceed through the reset phase, the threshold establishing phase, the data writing phase, and the light-emitting phase row by row, the light-emitting phase of each row of the pixel driving circuits may be extended to the reset phase of the next frame. However, as shown in FIG. 6, in one frame, since the reset phase of all row of the pixel driving circuits is performed simultaneously, and the threshold establishing phase of all row of the pixel driving circuits is performed simultaneously, the light-emitting phase of any row of the pixel driving circuits is extended up to the end of this frame. In order to ensure that the duration of the active level (low level) output by the enable signal end connected to each row of the pixel driving circuits is equal in one frame duration, the duration of the active level (low level) output by the enable signal end connected to each row of the pixel driving circuits needs to be compressed to a shorter duration. For example, the duration of the active level output by the enable signal end of the first row of the pixel driving circuits does not extend to the end of the frame to ensure that, when the duration of the active level output by the enable signal end of the last row of the pixel driving circuits extends to the end of the current frame, the duration of the active level output by the enable signal end of the last row of the pixel driving circuits is equal to the duration of the active level output by the enable signal end of the first row of the pixel driving circuits. That is, in this exemplary embodiment, the light-emitting duration of the pixel driving circuit is short and the light-emitting brightness of the light-emitting unit is low. However, this exemplary embodiment may increase the light-emitting brightness of the light-emitting unit by increasing the voltage of the data signal or decreasing the length L of the channel region of the driving transistor.

Figure 7:
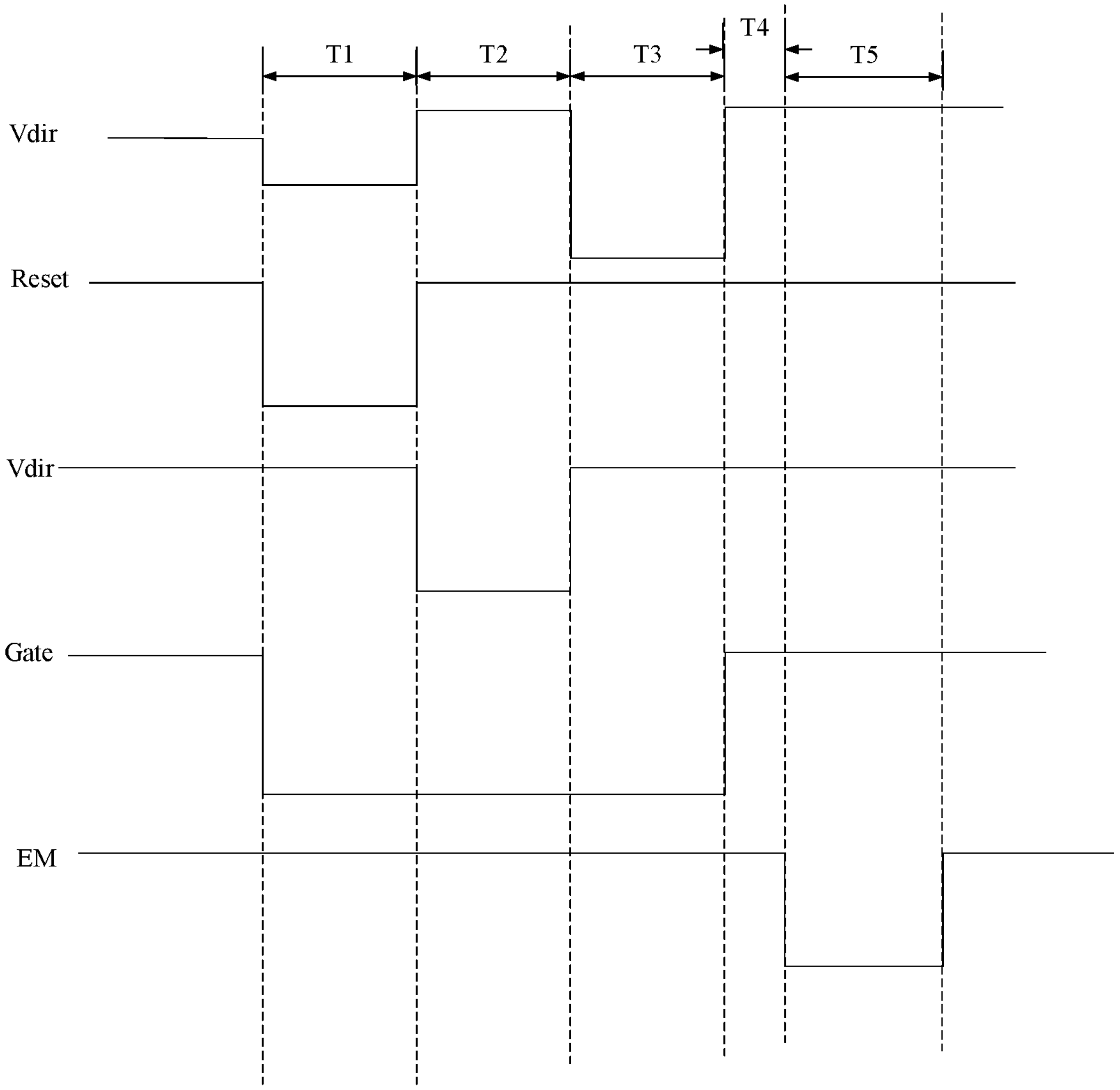
FIG. 7 is a timing diagram of each node in one exemplary method for driving a pixel driving circuit of the present disclosure.

In this exemplary embodiment, as shown in FIG. 7, which is a timing diagram of each node in one exemplary method for driving a pixel driving circuit of the present disclosure, similar to the timing diagram shown in FIG. 5, the method for driving the pixel driving circuit includes four phases, i.e., a reset phase T1, a threshold establishing phase T2, a data writing phase T3, and a light-emitting phase T5. The pixel driving circuit has a preset duration T4 after the data writing phase T3 is terminated and before the light-emitting phase T5 is started. In this display panel display method, during the driving process of each of the pixel driving circuits, the preset duration may be equal. Since the first capacitor of the pixel driving circuit and the second capacitor of the pixel driving circuit leak current during the preset duration T4, the voltage on the second node is lowered. If the preset durations in different pixel driving circuits are different, the voltage drops of the second nodes in different pixel driving circuits are different, which may result in uneven display brightness of the display panel. The preset duration of each pixel driving circuit during the driving process is set to be equal to avoid the above-mentioned problem.

In some embodiments, the one frame period of the display panel may include a blank period and a scanning period in order. The reset phase and the threshold establishing phase of all pixel driving circuits in the display panel are in the blank period of this frame.

In some embodiments, the one frame period of the display panel may include a scanning period and a blank period in order. The reset phase and the threshold establishing phase of all pixel driving circuits in the display panel are in the blank period of the previous frame.

This exemplary embodiment also provides a method for driving a pixel driving circuit, for driving the above-mentioned pixel driving circuit, the method includes: in a reset phase, inputting the initialization signal to the composite signal end, inputting a turn-on signal to the reset signal end, and simultaneously inputting a turn-on signal to gate driving signal end; in a threshold establishing phase, turning on the driving transistor by inputting the reference voltage signal to the composite signal end, inputting a turn-on signal to the control signal end, and simultaneously inputting a turn-on signal to the gate driving signal end; in a data writing phase, inputting the data signal to the composite signal end, and inputting a turn-on signal to the gate driving signal end; and in the light-emitting phase, inputting a turn-on signal to the enable signal end.

The method for driving the pixel driving circuit has been described in detail in the above-mentioned content, and will not be repeated here.

It should be understood that the present disclosure is not limited to the precise structure that has been described above and shown in the drawings, and that various modifications and changes may be made without departing from the scope thereof. The scope of the present disclosure is limited only by the appended claims.

What is claimed is:

1. A method for driving a display panel, wherein the display panel, comprising:

a pixel driving circuit, wherein the pixel driving circuit comprises:

- a signal writing circuit connected to a composite signal end, a gate driving signal end, and a first node, and configured to transmit a signal of the composite signal end to the first node in response to a signal of the gate driving signal end;
- a driving circuit connected to a first power supply end, a second node, and a third node, and configured to input a driving current to the third node according to a signal of the second node;
- a first memory circuit connected between the first node and the second node;
- a second memory circuit connected between the second node and the first power supply end;
- a compensation circuit connected to the second node, the third node, and a control signal end, and configured to connect the second node and the third node in response to a signal of the control signal end;
- a light-emitting control circuit connected to the third node, a fourth node, and an enable signal end, and configured to connect the third node and the fourth node in response to a signal of the enable signal end; and
- a reset circuit connected to the composite signal end, the second node, and a reset signal end, and configured to transmit the signal of the composite signal end to the second node in response to a signal of the reset signal end, wherein the reset circuit is directly connected to the composite signal end;

wherein the composite signal end is configured to output an initialization signal in a reset phase, output a reference voltage signal in a threshold establishing phase, and output a data signal in a data writing phase, and wherein the initialization signal is different from the reference voltage signal; and wherein the pixel driving circuit and other pixel driving circuits in a same row are connected to the same enable signal end; and in a same frame, enable signal ends connected to pixel driving circuits in a plurality rows are configured to output active levels row by row, wherein a duration of an active level output by the enable signal end connected to each row of the pixel driving circuits is equal, and the duration of the active level output by the enable signal end connected to each row of the pixel driving circuits is less than a duration of a scanning period;

one frame period of the display panel comprises a first blank period, the scanning period, and a second blank period in order; and the reset phase and the threshold establishing phase of each pixel driving circuit of the display panel are within a second blank period of a previous frame.

2. The method for driving the display panel according to claim 1, wherein the data writing phase of each pixel driving circuit of the display panel is in the scanning period of the frame.

3. The method for driving the display panel according to claim 1, wherein each pixel driving circuit has a preset duration after terminating the data writing phase and before starting a light-emitting phase, and during a driving process of each pixel driving circuit, the preset duration is equal.

* * * * *